(12) United States Patent
Faust et al.

(10) Patent No.: US 8,296,786 B2
(45) Date of Patent: Oct. 23, 2012

(54) AGENT-BASED REMOTE FUNCTION EXECUTION

(75) Inventors: Andrew E. Faust, West Jordan, UT (US); Michael E. Tabet, Draper, UT (US)

(73) Assignee: Microsoft Corporation, Redmond, WA (US)

( * ) Notice: Subject to any disclaimer, the term of this patent is extended or adjusted under 35 U.S.C. 154(b) by 199 days.

(21) Appl. No.: 12/887,515

(22) Filed: Sep. 22, 2010

(65) Prior Publication Data

US 2012/0072927 A1 Mar. 22, 2012

(51) Int. Cl.
*G06F 13/00* (2006.01)
(52) U.S. Cl. ........................................ 719/330; 709/202
(58) Field of Classification Search .................. 719/330; 709/202
See application file for complete search history.

(56) References Cited

U.S. PATENT DOCUMENTS

| | | | |
|---|---|---|---|
| 6,751,796 B1 * | 6/2004 | Seaman et al. ............... | 719/315 |
| 7,000,238 B2 | 2/2006 | Nadler et al. | |
| 7,263,702 B2 * | 8/2007 | Cho et al. ....................... | 719/317 |
| 7,743,423 B2 | 6/2010 | Lange et al. | |
| 8,151,360 B1 * | 4/2012 | Kishore et al. ................. | 726/28 |
| 2002/0107890 A1 * | 8/2002 | Gao et al. ....................... | 707/513 |
| 2007/0294676 A1 | 12/2007 | Mellor et al. | |

OTHER PUBLICATIONS

"Jayrock: JSON and JSON-RPC for .NET", Feb. 5, 2009, pp. 8.

Strahl, Rick, "Creating and Using Web Services with the .NET Framework and Visual Studio.Net", Mar. 7, 2002, pp. 24.
Wasznicky, Martin, "Using Web Services Instead of DCOM", Feb. 2002, pp. 36.
Srinivasan, Paddy, "An Introduction to Microsoft .NET Remoting Framework", Jul. 2001, pp. 9.
Swanson, Trent, "InfoQ: Getting Started With SharePoint Web Services", Feb. 6, 2008, pp. 15.
Martin, Pat, ".NET Remoting Architectural Assessment", May 2003, pp. 17.
".NET Remoting Overview", Aug. 5, 2010, pp. 2.
"How RPC Works", Aug. 5, 2010, pp. 2.
Russinovich, Mark, "PsExec v1.98", Apr. 28, 2009, pp. 2.
"Web Services Architecture", Aug. 5, 2010, pp. 106.
"Windows Communication Foundation Architecture", Aug. 5, 2010, pp. 2.

\* cited by examiner

*Primary Examiner* — Andy Ho
(74) *Attorney, Agent, or Firm* — Jared S. Goff

(57) ABSTRACT

A function call can be received at a remote execution module in a host environment. The call can instruct the remote execution module to remotely execute a specified function in a remote environment. The call can be received while an agent is executing in the remote environment. The function can be sent to the agent in the remote environment in response to receiving the call. The agent can be employed to perform acts, which can include receiving the function at the remote environment, executing the function in the remote environment in response to receiving the function, and sending results of executing the function to the execution module. Additionally, the execution module can be employed to receive the results from the agent and return the results as a response to the call.

20 Claims, 5 Drawing Sheets

AGENT-BASED REMOTE FUNCTION EXECUTION

BACKGROUND

Various tools have been used to launch code from a calling module in a host environment and actually execute the code in a remote environment. A remote environment refers to an environment that is remote from the host environment from which the call came, so that the host environment and the remote environment are in different computing sessions. Accordingly, the host and remote environments may be different real machines, different virtual machines, different user sessions, etc. For example, the remote environment may be a virtual machine that is hosted by the host environment, where the host environment is a non-virtual session in a physical machine. In some of these remote execution tools, the code to be executed (and possibly an agent to manage the execution) is pre-copied into the remote environment before the calling module requests that the tool remotely run the code. Other tools copy both the code to execute and an agent to run the code into the remote environment after receiving the request from the calling module, but the code is executed in a new separate process in the context of a current user of the host environment, so that the user of the host environment typically has to have administrative rights in the remote environment.

SUMMARY

Whatever the advantages of previous tools and techniques for running code remotely, they have neither recognized the agent-based remote function execution tools and techniques described and claimed herein. For example, the tools and techniques may include having an already-running agent in the remote environment ready to receive the function to be executed remotely. The agent may continue to run while it receives and remotely runs multiple functions. Also, a remote execution module may receive a function delegate, and the execution module can package a referenced function to send it to an agent in a remote environment.

In one embodiment, the tools and techniques can include receiving a function call at a remote execution module in a host environment. The call can instruct the remote execution module to remotely execute a specified function in a remote environment. The call can be received while an agent is executing in the remote environment. The function can be sent to the agent in the remote environment in response to receiving the call. The agent can be employed to perform acts, which can include receiving the function at the remote environment, executing the function in the remote environment in response to receiving the function, and sending results of executing the function to the execution module. Additionally, the execution module can be employed to receive the results from the agent and return the results as a response to the call.

In another embodiment of the tools and techniques, a function delegate can be received from a calling module. The function delegate can indicate a function to be executed in a remote environment. The function can be located and packaged in a portable execution package, and the execution package can be sent to an agent in a remote environment. Results of executing the function in the remote environment can be received from the agent and returned to the calling module.

In yet another embodiment of the tools and techniques, an agent can be executed in a remote environment. The executing agent can be listening for one or more functions to be run remotely. While the agent continues to execute, the agent can be employed to perform acts. These acts can include, in response to receiving a first function to be executed remotely, executing the first function in the remote environment and returning results of executing the first function to a host environment. The acts can also include, in response to receiving a second function to be executed remotely, executing the second function in the remote environment and returning results of executing the second function to a host environment.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
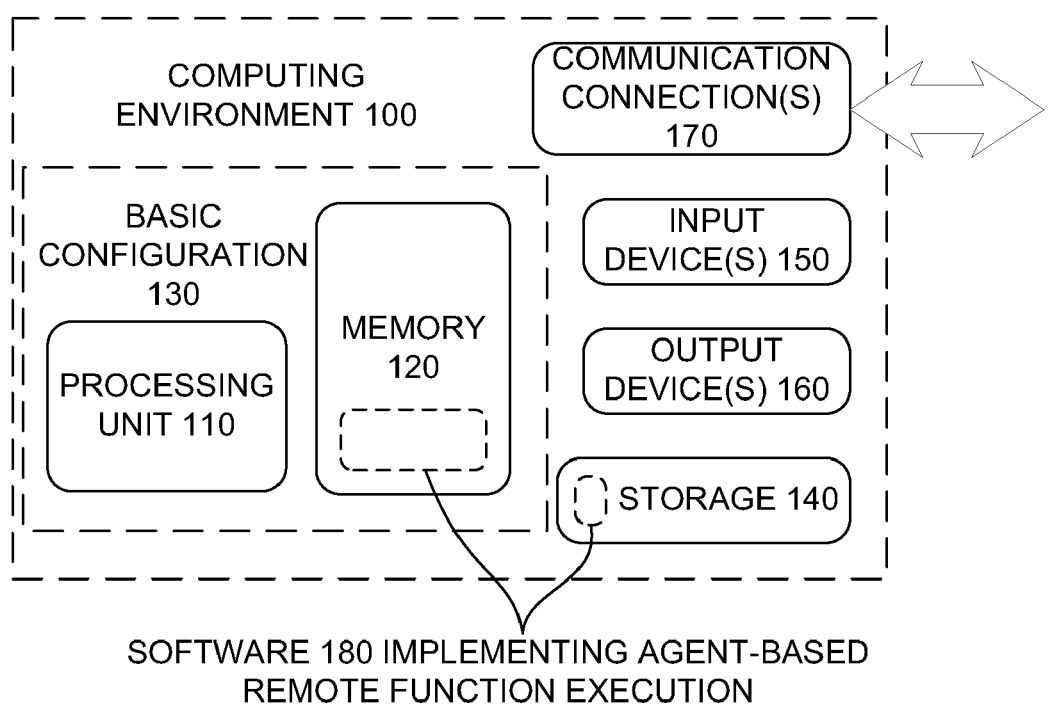
FIG. 1 is a block diagram of a suitable computing environment in which one or more of the described embodiments may be implemented.

Embodiments described herein are directed to techniques and tools for improved remote code execution. Such improvements may result from the use of various techniques and tools separately or in combination.

Such techniques and tools may include a remote execution module receiving a function call from a calling module, where the calling module and the remote execution module are both in a host environment. The call can instruct the remote execution module to execute a function remotely. For example, the call can include a function delegate for the function, along with parameters for executing the function. The remote execution module can send the function to an agent already executing in a remote environment as part of a portable execution package that includes the function. For example, the remote execution module may use reflection to locate the function by locating a library (e.g., a *.dll file) that includes the function. The remote execution module can package the library along with parameters, if any, for executing the function. The execution package can be sent to the agent. Upon receiving the execution package, the agent can unpack the execution package, and execute the function in the agent's own process in the remote environment. The agent can also receive results from the function, package those results, and return them to the remote execution module. The remote execution module can unpack the results package, and return the results to the calling module as a return on the original call from the calling module.

The tools and techniques for determining the function to send, packaging and transmitting the function, executing the function, and packaging and returning the results can produce one or more advantages. For example, the calling module can merely pass a function delegate in a call to the execution module, and receive results back from that call. The packaging, transmission and execution can be abstracted away by the remote execution tools that include the execution module in the host environment and the agent in the remote environment. This can allow for a clean and simple interface for a developer of a calling module (such as a software testing module) that will request remote execution of one or more functions using the tool that includes the execution module and the agent. The remote execution may be done without pre-copying the function into the remote environment, and it may be done without a user in the host environment having administrative privileges in the remote environment.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as a host environment and/or remote environment. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing agent-based remote function execution.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Agent-Based Remote Function Execution System

Figure 2:
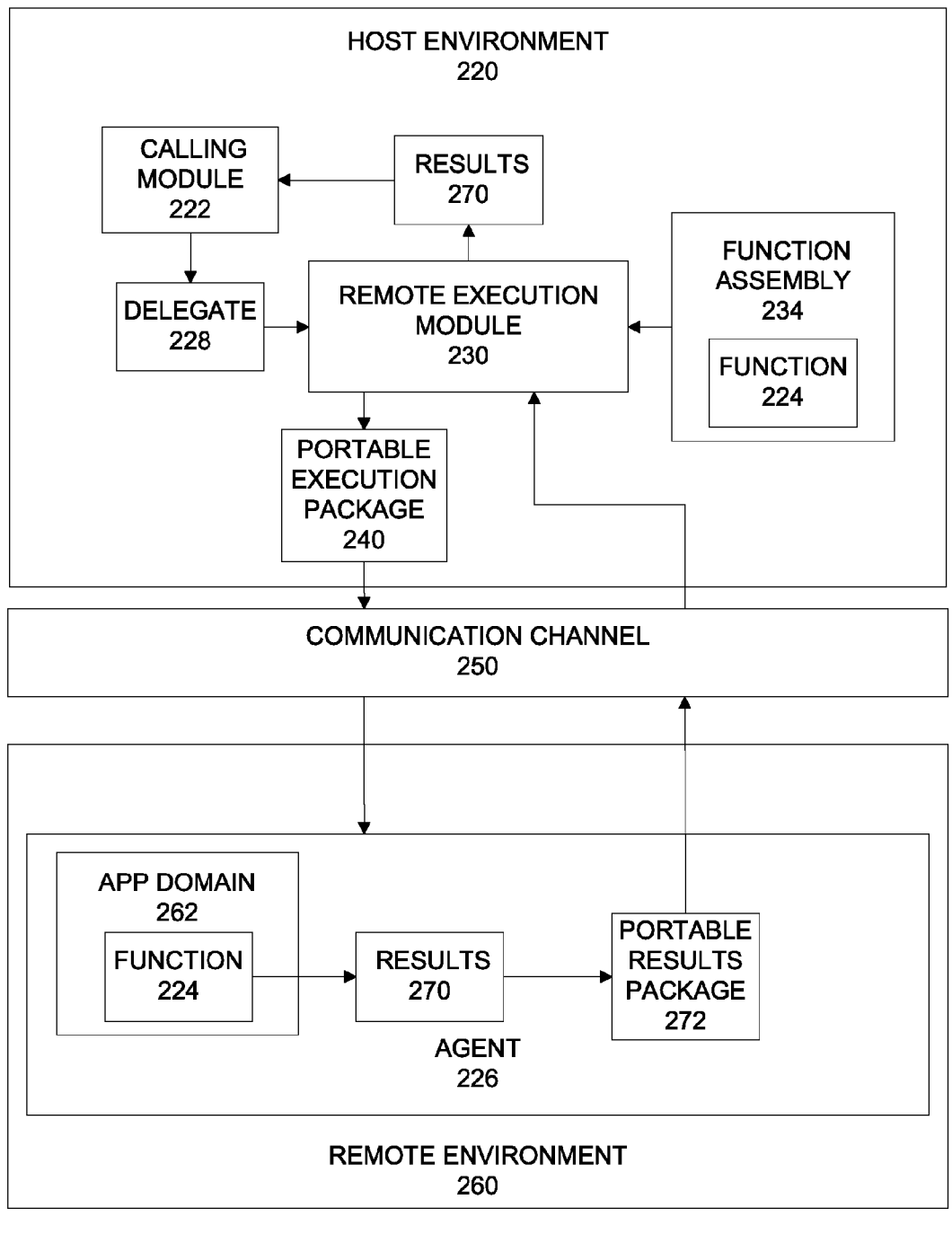
FIG. 2 is a block diagram of an agent-based remote function execution system.

FIG. 2 is a block diagram of an agent-based remote function execution system (200) in conjunction with which one or more of the described embodiments may be implemented. The system (200) can include a host environment (220), which can be a computing environment where a calling module (222) is executing. For example, the calling module (222) may be a software testing module, and the host environment may be a machine where the calling module is executing. The calling module (222) can request that a function (224) be executed remotely by merely sending a function delegate (228) for the function (224) to execute in a call to a remote execution module (230). The call can also include a list of parameters for the execution of the function (224). The remote execution module (230) is a module in the host environment (220) that can be called to initiate the remote function execution. The remote execution module (230) can abstract away from the calling module (222) the packaging and communications for executing the function (224) remotely. The remote execution module (230) may be an execution library that can be called by the calling module (222) and can execute in the same process as the calling module (222). The function delegate (228) is information in the call that points to the function (224) to be executed remotely. For example, the function delegate (228) can be a .NET delegate within the Microsoft .NET framework.

Upon receiving the call and the delegate (228), the remote execution module (230) can use reflection (e.g., .NET reflection in the Microsoft .NET framework) to locate an assembly (234) where the function (224) resides. For example, the assembly can be a library such as a *.dll file. The remote execution module (230) can read in the entire assembly (234) into a byte array. The remote execution module (230) can also convert the assembly (234) to a portable format. For example, the remote execution module (230) can convert the assembly (234) to a string using Base64 encoding.

The remote execution module (230) can also package the assembly (234), as converted, and the parameters into a portable execution package (240), and can send the execution package across a communication channel (250). The package (240) could be in any of various formats, such as an *.xml file. The communication channel (250) could also be any of various different types of channels through which a package such as an *.xml file can be sent. For example, the communication channel (250) can use named pipes. Other types of channels could include remote procedure calls, web service calls, Windows Communication Foundation, TCP/IP, etc.

The execution package (240) can be received at a remote environment (260) by a module running in remote environment, referred to herein as an agent (226). The agent (226) can be an active module that is loaded and executing in a process in the remote environment (260) even before the calling module (222) sends the delegate (228) to the remote execution module (230). For example, a user can log onto the remote environment (260) and execute the agent (226) (e.g., by copying in and running an executable file for the agent (226) in the remote environment (260)). If the remote environment (260) is a virtual machine (e.g., a virtual machine running in the host environment (220)), the virtual machine can already be running in the host environment (220) and the communication channel (250) can already be active.

While the agent (226) is executing, it can be listening for communications across the communication channel (250). When the agent (226) receives the execution package (240), the agent (226) can respond by instantiating a new application domain (262) (an isolated environment to execute code within an application or program's process) within the agent's process in the remote environment (260). Within the application domain (262), the agent (226) can convert the function assembly (234) from the Base64 string back into the byte array. The agent (226) can also execute the function (224) within the application domain. For example, the agent (226) can use .NET reflection to load the assembly (234), instantiate a class housing the function (224), and execute the function (224). The agent (226) can also capture the results (270) of the function, such as by receiving results (270) returned after the function (224) is called in the application domain (262).

After receiving the results (270), the agent (226) can terminate the application domain (262), package the results (270) into a portable results package (272), and return the portable results package (272) across the communication channel (250) to the remote execution module (230) in the host environment (220). The results package (272) may be in any of various portable information formats, such as an *.xml file. After the application domain (262) is terminated, it will no longer be taking up resources in the remote environment (260), and it will not cause conflicts with future versions of the function (224) that may be run in the remote environment at a later time.

Upon receiving the results package (272), the remote execution module (230) can unpack the results (270) from the results package (272), and return the results (270) to the calling module (222) as a return from the call made from the calling module (222). The calling module (222) can then resume execution, which may include processing the results (270) of executing the function (224) in the remote environment (260). Accordingly, the calling module (222) can simply make a call to the remote execution module (230) with a function delegate (228), and receive back the results (270) of running the function (224) in the remote environment (260) as a response to the call.

The remote execution module (230) and the agent (226) can work together to remotely execute additional functions in the future in the same manner. Such functions may be identified in function delegates from the same calling module (222) and/or from other calling modules. Indeed, the calling module (222) may send another call with a delegate identifying the same function (224) (either the same version or a later version of the function (224)), and the remote execution module (230) and the agent (226) can work together to remotely run the function (224) again. The agent (226) can be configured to run a variety of code (e.g., to run any code within the Microsoft .NET framework), so that the agent (226) does not need to be redeployed each time a different function or a different version of a function is to be run remotely by the agent (226).

III. Agent-Based Remote Function Execution Techniques

Several agent-based remote function execution techniques will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
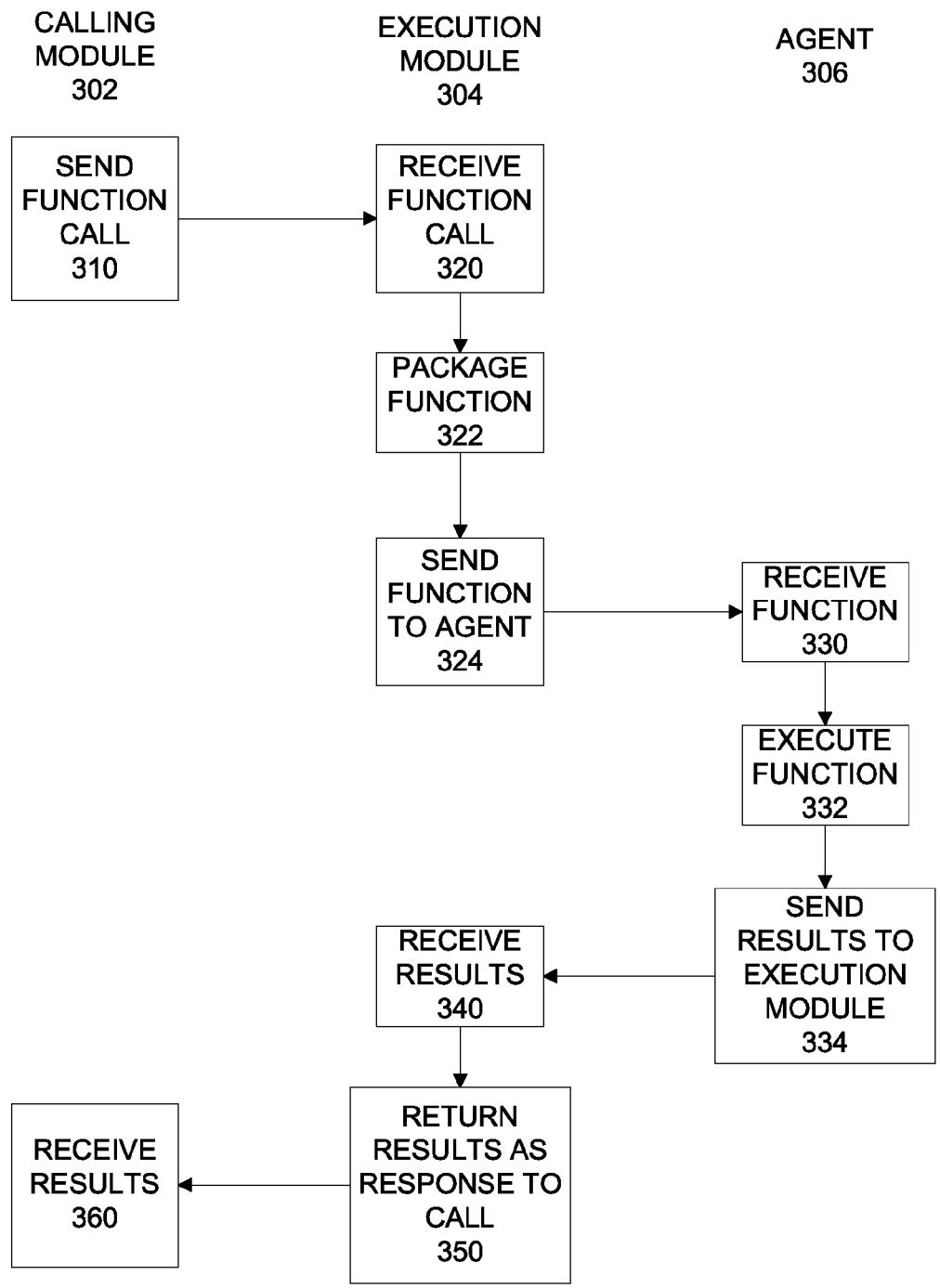
FIG. 3 is flowchart of an agent-based remote function execution technique.

Referring to FIG. 3, an agent-based remote function execution technique will be discussed. The technique can include employing different modules to perform different acts, as described below. The modules can include a calling module (302), which can be executing in a host environment; a remote execution module (304), which can also be executing in the host environment; and an agent (306), which can be a module executing in a remote environment (e.g., a virtual machine in the host environment). The calling module (302) and the execution module (304) may both be executing in one process in the host environment. For example, the calling module (302) may be an executing program and the execution module (304) may be a library or part of a library in the host environment. In FIG. 3, the acts represented by boxes in the column labeled calling module (302) can be performed by the calling module (i.e., the calling module (302) can be employed to perform those acts); the acts represented by boxes in the column labeled execution module (304) can be performed by the execution module (304) (i.e., the execution module (304) can be employed to perform those acts); and the acts represented by boxes in the column labeled agent (306) can be performed by the agent (306) (i.e., the agent (306) can be employed to perform those acts).

The technique of FIG. 3 can include the calling module (302) sending (310) a function call, which can be received (320) at the execution module in the host environment. The function call can take various forms, but it may include a function delegate for the function, and it may include parameters for executing the function. The call can instruct the execution module to remotely execute a specified function in a remote environment. For example, the calling module (302) can be a testing module and the function can be executed to test something in the remote environment. The agent (306) can already be executing in the remote environment when the call is received (320). Indeed, the agent (306) may be executing in the remote environment before the calling module (302) begins executing in the host environment. In response to receiving (320) the call, the execution module (304) can package (322) the function into a portable package (which may also include parameters for executing the function), and can send (324) the function to the agent (306), such as by sending the portable package.

The agent (306) can receive (330) the function at the remote environment. Additionally, in response to receiving (330) the function, the agent (306) can execute (332) the function in the remote environment. The function may execute within the same process where the agent (306) is already executing. For example, executing (332) the function may include unpacking a portable execution package that includes the function, initiating an application domain for the function (which can be within the process where the agent (306) is executing), executing the function in the application domain, and terminating the application domain after the function is done executing. The agent (306) can also receive results of executing (332) the function, and can send (334) the results to the execution module. For example, the results may be sent (334) in a package such as an *.xml file. The execution module (304) can receive (340) the results, which may include unpacking the results if the results have been packaged for sending. The execution module (304) can also return (350) the results as a response to the call from the calling module (302), and the results can be received (360) by the calling module (302).

Figure 4:
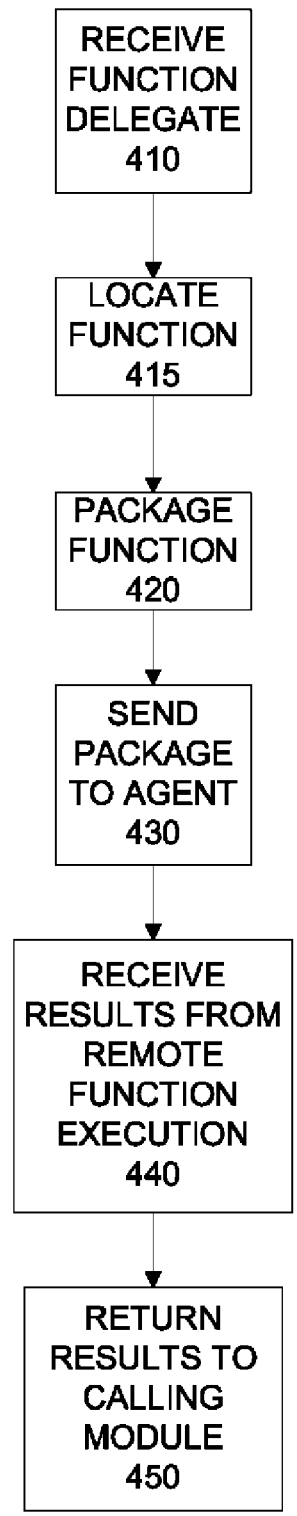
FIG. 4 is a flowchart of another agent-based remote function execution technique.

Referring to FIG. 4, another agent-based remote function execution technique will be discussed. For example, this technique may be performed by a remote execution module in a host environment. The technique can include receiving (410) a function delegate from a calling module. The function delegate can indicate a function to be executed in a remote environment. The calling module can be a testing module, and the function can be executed to test something in the remote environment. The technique can also include locating (415) the function (e.g., using Microsoft .NET reflection) and packaging (420) the function in a portable execution package. The package can include a dynamically linked library that includes the function. The technique can include sending (430) the portable execution package to an agent in the remote environment. The agent can be executing in the remote environment before the function delegate is received (410) from the calling module, and possibly even before the calling module is executing. Results of executing the function in the remote environment can be received (440). Additionally, the results can be returned (450) to the calling module.

Figure 5:
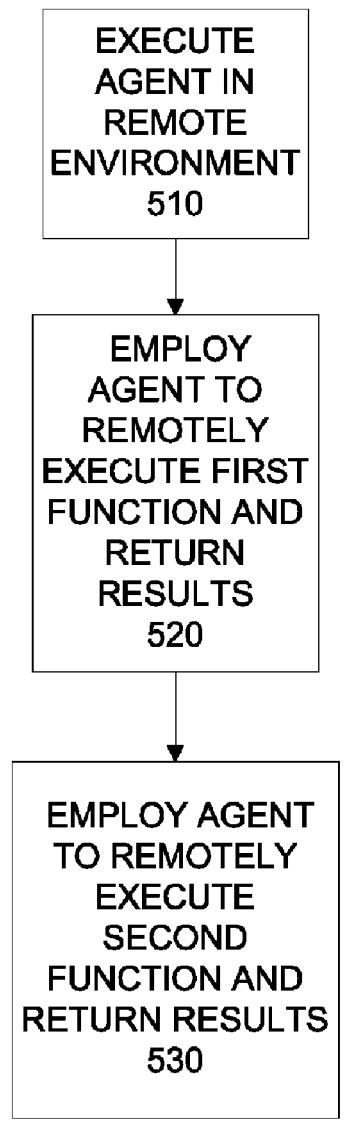
FIG. 5 is a flowchart of yet another agent-based remote function execution technique.

Referring to FIG. 5, yet another agent-based remote function execution technique will be discussed. The technique can include executing (510) an agent in a remote environment. The executing agent can listen for one or more functions to be executed remotely. While the agent continues to execute, the agent can be employed (520), in response to receiving the first function, to execute a first function in the remote environment and return results of executing the first function to a host environment. Also, while the agent continues to execute, the agent can be employed (530), in response to receiving the second function, to execute a second function in the remote environment and return results of executing the second function to a host environment.

In the technique of FIG. 5, the remote environment may be a virtual machine. The agent can be executing in a process, and the first and second functions can both be executed in the process. The first function may be executed in an application domain in the process. Also, the application domain can be a first application domain, where the first application domain is terminated after executing the first function. The second function can be executed in a second application domain, where the second application domain is terminated after executing the second function. The first and second functions may be unrelated functions, or they may be related functions. For example, the second function may be an updated version of the first function. Indeed, the second function may be the same as the first function, but sent to the agent at a later time.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
receiving a function call at a remote execution module in a host environment, the call instructing the remote execution module to remotely execute a specified function in a remote environment, and the call being received while an agent is executing in the remote environment;
sending the function to the agent in the remote environment in response to receiving the call;
employing the agent to perform acts comprising:
receiving the function at the remote environment;
executing the function in the remote environment in response to receiving the function; and
sending results of executing the function to the execution module; and
employing the execution module to receive the results from the agent and return the results as a response to the call.

2. The method of claim 1, further comprising packaging the function in a portable execution package, wherein sending the function to the agent comprises sending the portable execution package to the agent.

3. The method of claim 1, further comprising sending the function call from a calling module to the remote execution module.

4. The method of claim 3, wherein the calling module and the remote execution module execute in one process in the host environment.

5. The method of claim 3, wherein the calling module is a testing module.

6. The method of claim 1, wherein the remote execution module is a library in the host environment.

7. The method of claim 1, wherein the agent executes in a process in the host environment, and wherein executing the function in the remote environment comprises executing the function in a process where the agent is executing.

8. The method of claim 1, wherein the function call comprises a function delegate for the function.

9. The method of claim 1, wherein the remote environment is a virtual machine.

10. The method of claim 1, further comprising:
packaging the function in a portable execution package;
sending the function call from a calling module to the remote execution module;
wherein:
sending the function to the agent comprises sending the portable execution package to the agent;
the calling module and the remote execution module execute in one process in the host environment;
the calling module is a testing module;
the remote execution module is a library in the host environment;
the agent executes in a process in the remote environment;
executing the function in the remote environment comprises executing the function in one process with the agent;
the function call comprises a function delegate for the function; and
the remote environment is a virtual machine.

11. A computer system comprising:
at least one processor; and
a memory comprising instructions stored thereon that when executed by the at least one processor cause the at least one processor to perform acts comprising:
receiving a function delegate from a calling module, the function delegate indicating a function to be executed in a remote environment;
locating the function;
packaging the function in a portable execution package;
sending the portable execution package to an agent in the remote environment;
receiving from the agent results of executing the function in the remote environment; and
returning the results to the calling module.

12. The computer system of claim 11, wherein the execution package comprises a dynamically linked library that includes the function.

13. The computer system of claim 11, wherein the calling module is a testing module.

14. The computer system of claim 11, wherein the agent is executing in the remote environment before the function delegate is received from the calling module.

15. One or more computer-readable storage media having computer-executable instructions embodied thereon that, when executed by at least one processor, cause the at least one processor to perform acts comprising:
executing an agent in a remote environment, the agent listening for one or more functions to be executed remotely;
while the agent continues to execute, employing the agent to perform acts comprising:
in response to receiving a first function to be executed remotely, executing the first function in the remote environment and returning results of executing the first function to a host environment; and
in response to receiving a second function to be executed remotely, executing the second function in the remote environment and returning results of executing the second function to a host environment.

16. The one or more computer-readable storage media of claim 15, wherein the remote environment is a virtual machine.

17. The one or more computer-readable storage media of claim 15, wherein the agent is executing in a process, and wherein the first function and the second function are both executed in the process.

18. The one or more computer-readable storage media of claim 17, wherein the first function is executed in an application domain in the process.

19. The one or more computer-readable storage media of claim 18, wherein the application domain is a first application domain, wherein the first application domain is terminated after executing the first function, wherein the second function is executed in a second application domain, and wherein the second application domain is terminated after executing the second function.

20. The one or more computer-readable storage media of claim 15, wherein the second function is an updated version of the first function.

* * * * *